United States Patent
Izumi et al.

(10) Patent No.: US 7,806,791 B2
(45) Date of Patent: Oct. 5, 2010

(54) CONTINUOUSLY VARIABLE TRANSMISSION AND CONTROL METHOD THEREOF

(75) Inventors: Tetsuya Izumi, Yokohama (JP); Hironori Nihei, Zama (JP); Seonjae Kim, Seoul (KR); Naohiro Hoshi, Okazaki (JP); Kwang-ho Lee, Seoul (KR)

(73) Assignee: JATCO Ltd, Fuji-shi (JP)

( * ) Notice: Subject to any disclaimer, the term of this patent is extended or adjusted under 35 U.S.C. 154(b) by 324 days.

(21) Appl. No.: 11/540,961

(22) Filed: Oct. 2, 2006

(65) Prior Publication Data

US 2007/0093356 A1    Apr. 26, 2007

(30) Foreign Application Priority Data

Oct. 4, 2005    (JP)    ............................. 2005-290918

(51) Int. Cl.
*F16H 61/02* (2006.01)
(52) U.S. Cl. .......................................... 474/28; 474/18
(58) Field of Classification Search .................. 474/8, 474/11, 12, 17–18, 22, 28
See application file for complete search history.

(56) References Cited

U.S. PATENT DOCUMENTS

| 5,788,599 A | 8/1998 | Adachi et al. |
| 6,219,608 B1 * | 4/2001 | Abo et al. ...................... 701/51 |
| 6,916,269 B2 * | 7/2005 | Yamamoto et al. ............ 477/46 |
| 2004/0127313 A1 * | 7/2004 | Shimanaka et al. ........... 474/18 |

FOREIGN PATENT DOCUMENTS

| EP | 0 899 486 A2 | 3/1999 |
| EP | 1 396 665 A2 | 3/2004 |
| JP | 2004-100736 A | 4/2004 |

* cited by examiner

*Primary Examiner*—Robert A Siconolfi
*Assistant Examiner*—Anna Momper
(74) *Attorney, Agent, or Firm*—Foley & Lardner LLP

(57) ABSTRACT

A positional deviation ERRstep of a step motor 27 is calculated on the basis of a reference model step StepMdl, an actual speed ratio-corresponding step Bstep, and an added value obtained by adding together a target deviation GTstep, calculated in accordance with a transmission input torque Ti, and a starting learned value Gstep. When the transmission input torque Ti is large, the target deviation GTstep is increased in accordance with the transmission input torque Ti. A line pressure PL is then controlled on the basis of the positional deviation ERRstep obtained as a result.

8 Claims, 8 Drawing Sheets

CONTINUOUSLY VARIABLE TRANSMISSION AND CONTROL METHOD THEREOF

FIELD OF THE INVENTION

This invention relates to a line pressure control for a continuously variable transmission.

BACKGROUND OF THE INVENTION

A continuously variable transmission performs power transmission by means of a V belt, for example, which is wrapped around a primary pulley into which an engine rotation is input and a secondary pulley on an output side which is joined to a vehicle wheel.

In a continuously variable transmission, the step count of a step motor is controlled to realize a target speed ratio, and as a result, the pressure of the primary pulley is controlled.

JP2004-100736A discloses a conventional device which, when controlling a line pressure serving as the source pressure of a primary pulley pressure and a secondary pulley pressure of a continuously variable transmission, takes a line pressure discrepancy caused by an error in the attachment of the step motor into account.

SUMMARY OF THE INVENTION

However, when the engine torque increases in the prior art described above, i.e. in a high load state, the line pressure is raised even when the line pressure is sufficient in reality, leading to an excessive line pressure and deterioration of the fuel economy.

The reason for this is as follows. In a high load state, the deviation between a step count of the step motor corresponding to the target speed ratio and an added value obtained by adding a correction value determined according to the attachment error to the actual step count of the step motor is overestimated, and since the line pressure is controlled in accordance with this deviation, the line pressure is determined as being deficient in a high load state even when the actual line pressure is not deficient, and hence the line pressure is raised.

This invention has been designed to solve this problem, and it is an object thereof to prevent excessive line pressure in a high load state, thereby improving the fuel economy and suppressing oil temperature increases.

In order to achieve above the object, this invention provides a continuously variable transmission. The transmission comprises an input side primary pulley having a groove width which varies according to an oil pressure, an output side secondary pulley having a groove width which varies according to an oil pressure, a belt wrapped around the primary pulley and the secondary pulley, a pulley-contacting radius of which varies according to the groove width, an actuator which varies the oil pressure of the primary pulley according to a driving condition, and a controller.

The controller calculates a reference model operating position, which is an operating position of the actuator corresponding to a target speed ratio, calculates an actual operating position of the actuator from an actual speed ratio between the primary pulley and the secondary pulley, calculates a primary pulley input torque, calculates an actuator operating position deviation correction amount when the primary pulley input torque is on a high torque side to be larger than the actuator operating position deviation correction amount when the primary pulley input torque is on a low torque side, and controls a line pressure, which serves as a source pressure of the oil pressure of the primary pulley and the oil pressure of the secondary pulley, on the basis of the reference model operating position, the actual operating position, and the actuator operating position deviation correction amount.

According to this invention, when the primary pulley input torque increases, the actuator operating position deviation correction amount is calculated to be large, and the line pressure is controlled on the basis of the reference model operating position of the actuator, which corresponds to the target speed ratio, the actual operating position of the actuator, which is determined from the actual speed ratio, and the actuator operating position deviation correction amount. As a result, excessive line pressure can be prevented from occurring on the high torque side, the fuel economy can be improved, and oil temperature increases can be suppressed.

The details as well as other features and advantages of this invention are set forth in the remainder of the specification and are shown in the accompanying drawings.

DETAILED DESCRIPTION OF THE PREFERRED EMBODIMENT

Figure 1:
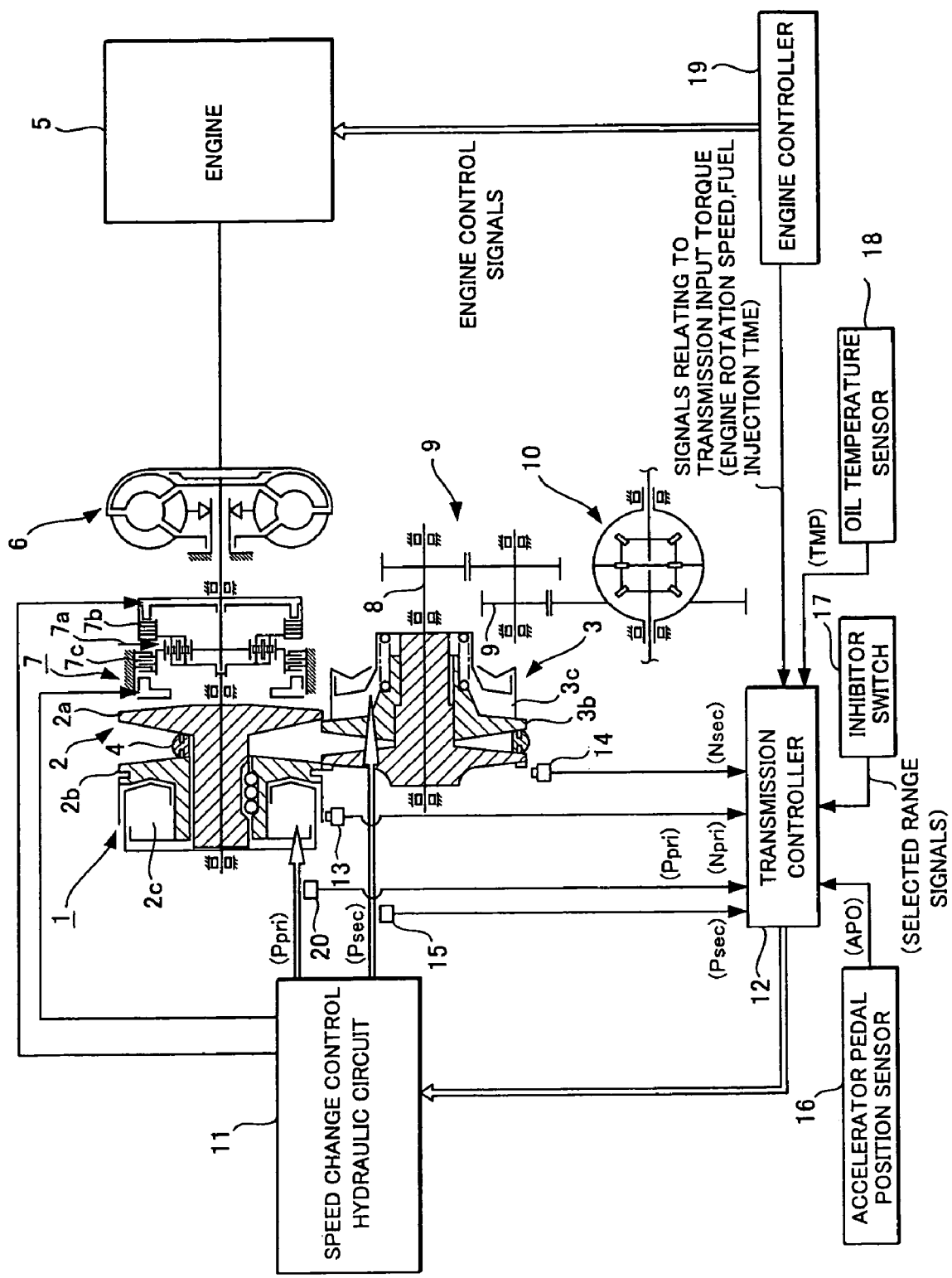
FIG. 1 is a schematic diagram of a continuously variable transmission according to an embodiment of this invention.

An embodiment of this invention will be described in detail below on the basis of the drawings. FIG. 1 shows an outline of a V belt continuously variable transmission 1. The V belt continuously variable transmission comprises a primary pulley 2 and a secondary pulley 3 arranged such that the V grooves of the two are aligned, and a V belt (belt) 4 which is wrapped around the V grooves of the pulleys 2, 3. An engine 5 is disposed coaxial with the primary pulley 2, and a torque converter 6 comprising a lockup clutch and a forward-reverse switching mechanism 7 are provided between the engine 5 and primary pulley 2 in succession from the engine 5 side.

The forward-reverse switching mechanism 7 comprises a double pinion planetary gear set 7a as a principal constitutional element, the sun gear thereof being joined to the engine 5 via the torque converter 6 and the carrier thereof being joined to the primary pulley 2. The forward-reverse switching mechanism 7 further comprises a forward clutch 7b which is directly coupled between the sun gear and carrier of the double pinion planetary gear set 7a, and a reverse brake 7c which fixes a ring gear. When the forward clutch 7b is engaged, an input rotation input from the engine 5 via the torque converter 6 is transmitted to the primary pulley 2 as is, and when the reverse brake 7c is engaged, the input rotation input from the engine 5 via the torque converter 6 is reversed and transmitted to the secondary pulley 3.

The rotation of the primary pulley 2 is transmitted to the secondary pulley 3 via the V belt 4, and the rotation of the secondary pulley 3 is transmitted thereafter to a vehicle wheel, not shown in the drawing, via an output shaft 8, a gear set 9, and a differential gear device 10.

To make a rotation transmission ratio (speed ratio) between the primary pulley 2 and secondary pulley 3 variable during this power transmission, the conical plates forming the respective V grooves of the primary pulley 2 and secondary pulley 3 are divided into fixed conical plates 2a, 3a, and movable conical plates 2b, 3b which are capable of axial displacement. The movable conical plates 2b, 3b are biased toward the fixed conical plates 2a, 3a through the supply of a primary pulley pressure Ppri and a secondary pulley pressure Psec, which are generated using a line pressure as a source pressure, to a primary pulley chamber 2c and a secondary pulley chamber 3c. As a result, the V belt 4 is caused to frictionally engage with the conical plates such that power transmission between the primary pulley 2 and secondary pulley 3 is performed.

During a speed change, the V groove width of the two pulleys 2, 3 is varied by the differential pressure between the primary pulley pressure Ppri and secondary pulley pressure Psec, which are generated in accordance with a target speed ratio I (o), and by continuously varying the wrapped arc diameter of the V belt 4 relative to the pulleys 2, 3, the target speed ratio I (o) is realized.

The outputs of the primary pulley pressure Ppri and secondary pulley pressure Psec are controlled by a speed change control hydraulic circuit 11 together with the output of an engagement oil pressure of the forward clutch 7b, which is engaged when a forward traveling range is selected, and an engagement oil pressure of the reverse brake 7c, which is engaged when a reverse traveling range is selected. The speed change control hydraulic circuit 11 performs control in response to a signal from a transmission controller 12.

Signals from a primary pulley rotation sensor 13 which detects a primary pulley rotation speed Npri, signals from a secondary pulley rotation sensor 14 which detects a secondary pulley rotation speed Nsec, signals from a primary pulley pressure sensor (primary pressure detecting means) 20 which detects the primary pulley pressure Ppri, signals from a secondary pulley pressure sensor 15 which detects the secondary pulley pressure Psec, signals from an accelerator pedal position sensor 16 which detects an accelerator pedal position APO, selected range signals from an inhibitor switch 17, signals from an oil temperature sensor 18 which detects a speed change hydraulic fluid temperature TMP, and signals (engine rotation speed and fuel injection time) relating to a transmission input torque Ti from an engine controller 19 which controls the engine 5, are input into the transmission controller 12.

Figure 2:
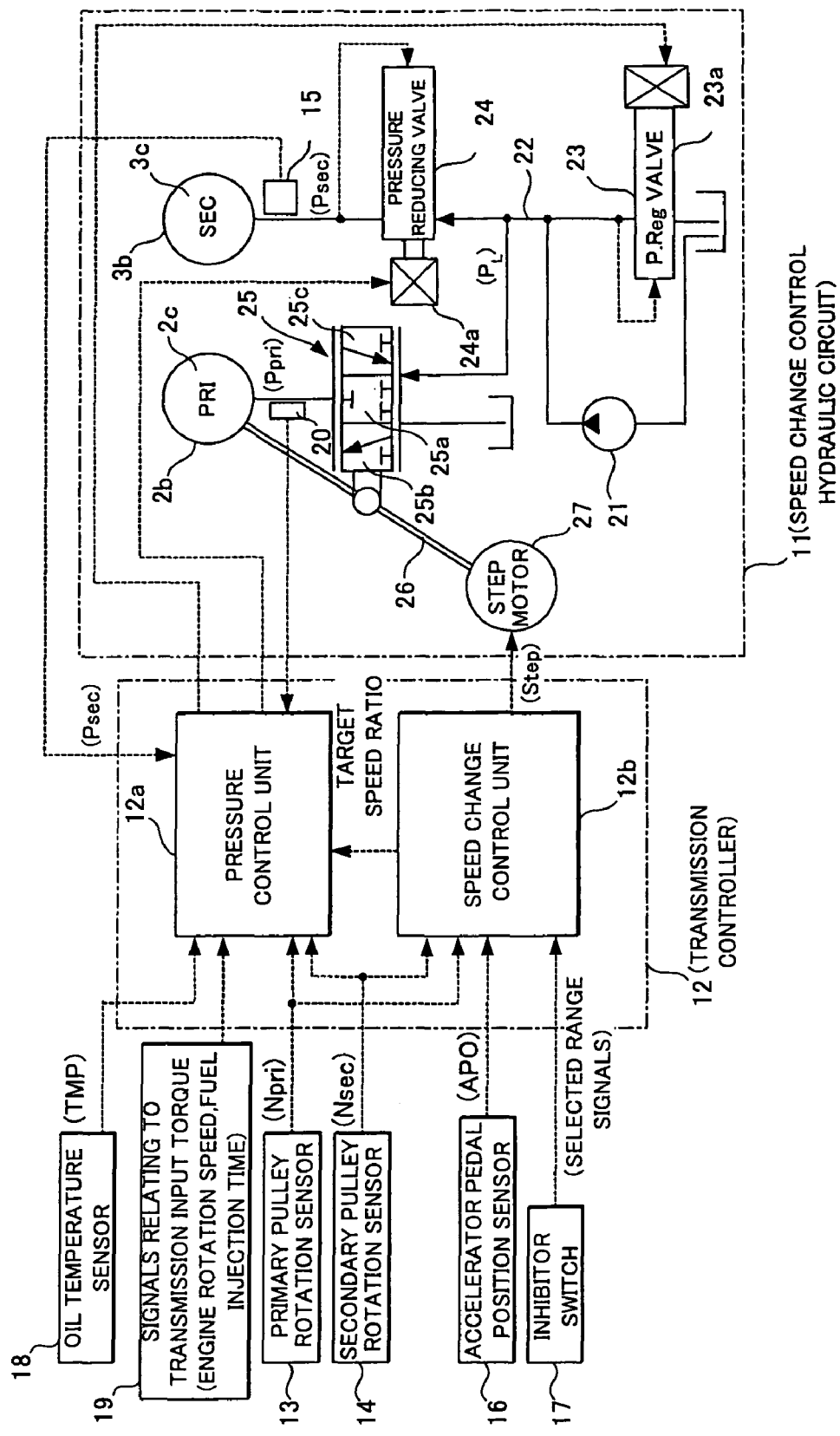
FIG. 2 is a schematic diagram of a speed change control hydraulic circuit and a transmission controller according to an embodiment of this invention.

Next, the speed change control hydraulic circuit 11 and transmission controller 12 will be described using the schematic diagram in FIG. 2. First, the speed change control hydraulic circuit 11 will be described.

The speed change control hydraulic circuit 11 comprises an engine-driven oil pump 21, and regulates a hydraulic fluid, which serves as a medium, supplied to an oil passage 22 by the oil pump 21 to a predetermined line pressure PL using a pressure regulator valve 23. The pressure regulator valve 23 controls the line pressure PL in accordance with a drive duty input into a solenoid 23a.

The line pressure PL in the oil passage 22 is adjusted by a pressure reducing valve 24 and supplied to the secondary pulley chamber 3c as the secondary pulley pressure Psec on the one hand, and adjusted by a speed change control valve 25 and supplied to the primary pulley chamber 2c as the primary pulley pressure Ppri on the other hand. The pressure reducing valve 24 controls the secondary pulley pressure Psec in accordance with a drive duty input into a solenoid 24a.

The speed change control valve 25 comprises a neutral position 25a, a pressure increasing position 25b, and a pressure reducing position 25c, and to switch between these valve positions, the speed control valve 25 is connected to the middle of a speed change link 26. The speed change link 26 is connected to a step motor 27 serving as a speed change actuator at one end thereof, and to the movable conical plate 2b of the primary pulley 2 at the other end thereof.

The step motor 27 is set in an operating position which is advanced from a reference position by a step count Step corresponding to the target speed ratio I (o), and through the operation of the step motor 27, the speed change link 26 swings using a connecting portion with the movable conical plate 2b as a fulcrum. As a result, the speed change control valve 25 is moved from the neutral position 25a to the pressure increasing position 25b or the pressure reducing position 25c. Hence, the primary pulley pressure Ppri is increased using the line pressure PL as a source pressure or decreased through a drain, and thus the differential pressure between the primary pulley pressure Ppri and secondary pulley pressure Psec is varied so as to generate an upshift to a High side speed ratio or a downshift to a Low side speed ratio. Accordingly, a speed change following the target speed ratio I (o) is performed.

The speed change advancement is fed back to the corresponding end of the speed change link 26 via the movable conical plate 2b of the primary pulley 2, and the speed change link 26 swings about a connecting portion with the step motor 27 in a direction which returns the speed change control valve 25 from the pressure increasing position 25b or the pressure reducing position 25c to the neutral position 25a. Hence, when the target speed ratio I (o) is reached, the speed change control valve 25 is returned to the neutral position 25a so that the target speed ratio I (o) can be maintained.

The solenoid drive duty of the pressure regulator valve 23, the solenoid drive duty of the pressure reducing valve 24, and a speed change command (step count) input into the step motor 27 are controlled by the transmission controller 12. The transmission controller 12 also performs control to determine whether or not to supply the engagement oil pressure to the forward clutch 7b and reverse brake 7c shown in FIG. 1. The transmission controller 12 is constituted by a pressure control unit (line pressure controlling means) 12a and a speed change control unit 12b.

The pressure control unit 12a determines the solenoid drive duty of the pressure regulator valve 23 and the solenoid drive duty of the pressure reducing valve 24 in a manner to be described below, and the speed change control unit 12b calculates the target speed ratio I (o) as follows.

The speed change control unit 12b uses a vehicle speed TVO, determined from the secondary pulley rotation speed Nsec, and the accelerator pedal position APO to determine a target input rotation speed based on a preset speed change map. A theoretical speed ratio Ip corresponding to the driving conditions (the vehicle speed and accelerator pedal position APO) is then determined by dividing the target input rotation speed by the secondary pulley rotation speed Nsec.

Next, an actual speed ratio ip is calculated by dividing the primary pulley rotation speed Npri by the secondary pulley rotation speed Nsec, and a deviation between the theoretical speed ratio Ip and the actual speed ratio ip is determined. The target speed ratio I (o) is then calculated by multiplying a first-order lag filter $\{1/(Tm \cdot s+1)\}$ taking account of a hardware response delay by a disturbance-compensated theoretical speed ratio I.

Figure 3:
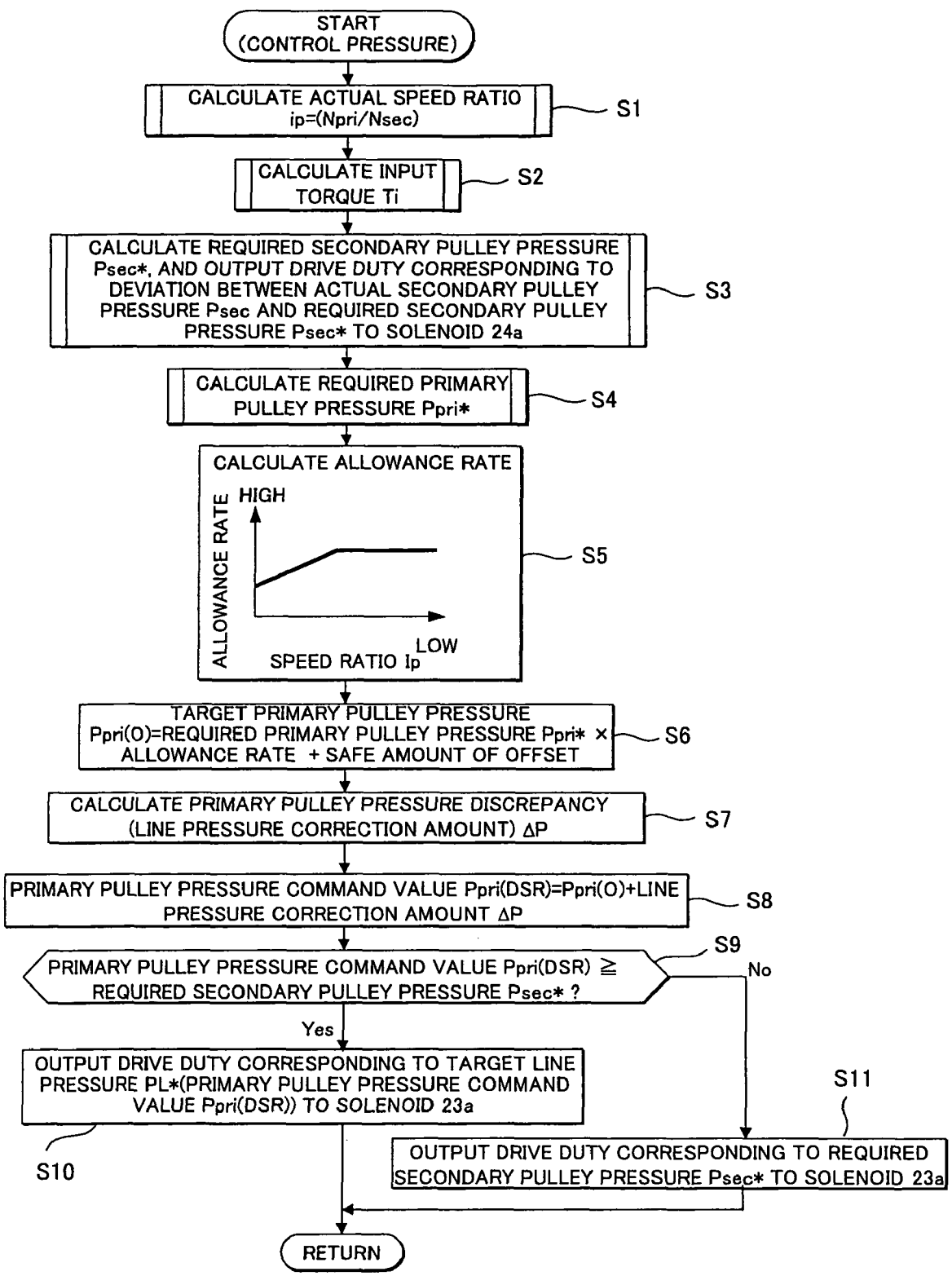
FIG. 3 is a flowchart of control performed by a pressure control unit according to an embodiment of this invention.

Next, the pressure control unit 12a controls the line pressure PL by executing control such as that shown in FIG. 3 repeatedly at fixed time interval interruptions. FIG. 3 is a flowchart showing the control performed by the pressure control unit 12a.

In a step S1, the actual speed ratio ip is calculated by dividing the primary pulley rotation speed Npri detected by the primary pulley rotation sensor 13 by the secondary pulley rotation speed Nsec detected by the secondary pulley rotation sensor 14.

In a step S2, the engine torque is calculated on the basis of the engine rotation speed and fuel injection time obtained from the engine controller 19 (see FIG. 1), and a transmission input torque (primary pulley input torque) Ti is calculated by multiplying the engine torque by an amplification factor of the torque converter 6 (the step S2 constitutes primary pulley input torque calculating means).

Figure 4:
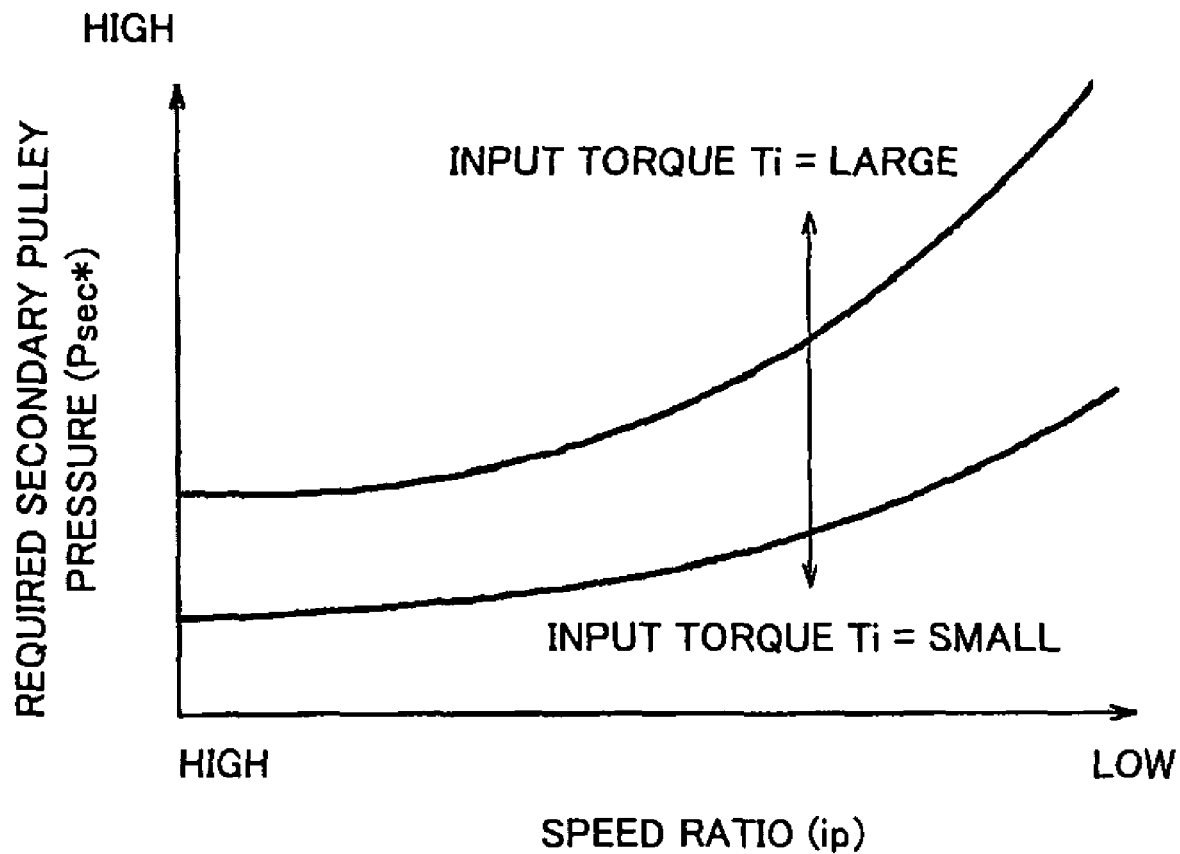
FIG. 4 is a map for calculating a required secondary pulley pressure according to an embodiment of this invention.

In a step S3, a required secondary pulley pressure Psec* is calculated from the actual speed ratio ip calculated in the step S1 and the transmission input torque Ti calculated in the step S2 on the basis of a map, an example of which is shown in FIG. 4, and through feedback control corresponding to the deviation between the actual secondary pulley pressure Psec detected by the secondary pulley pressure sensor 15 and the required secondary pulley pressure Psec*, the drive duty of the pressure reducing valve 24 is determined such that the actual secondary pulley pressure Psec matches the required secondary pulley pressure Psec*. This drive duty is then output to the solenoid 24a.

Figure 5:
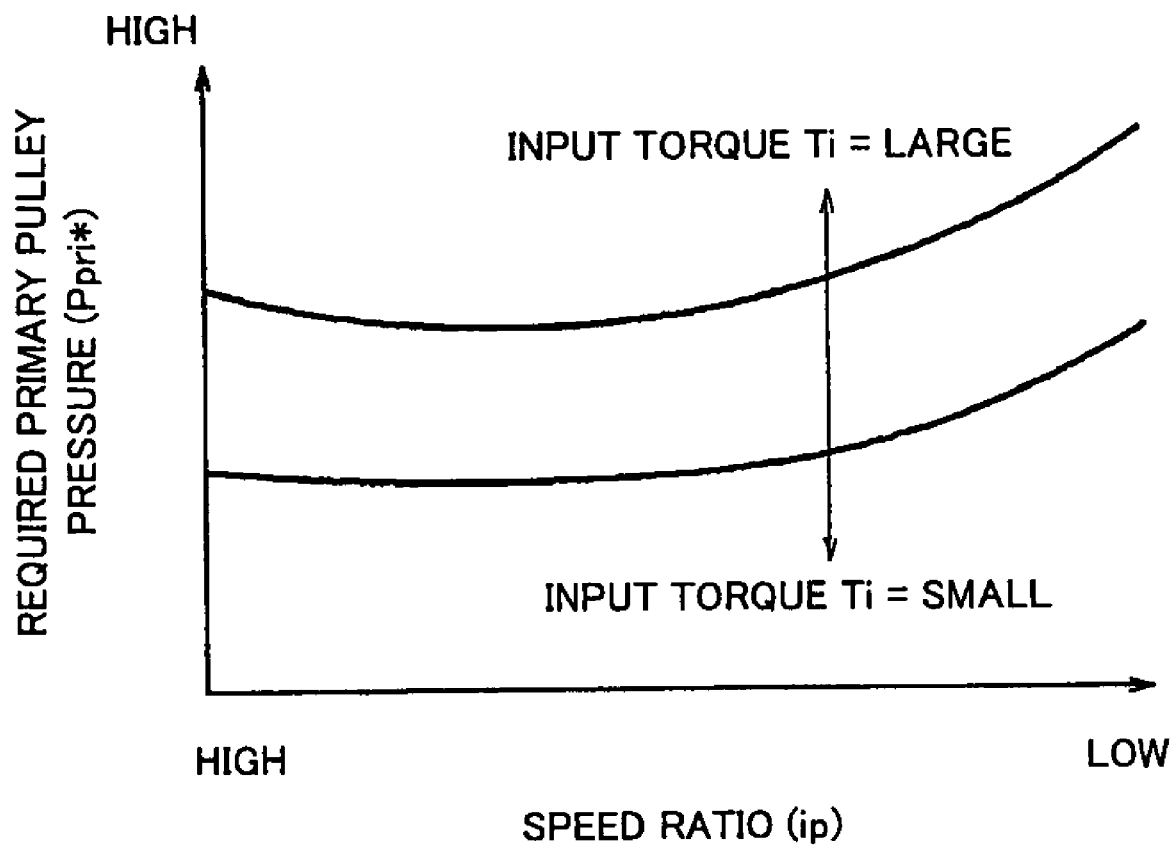
FIG. 5 is a map for calculating a required primary pulley pressure according to an embodiment of this invention.

In a step S4, a required primary pulley pressure Ppri* is calculated from the actual speed ratio ip and the transmission input torque Ti on the basis of a map, an example of which is shown in FIG. 5.

In a step S5, an allowance rate to be set in the primary pulley pressure taking pressure loss in the speed change control valve 25 into account is calculated from the actual speed ratio ip on the basis of a preset map.

In a step S6, a target primary pulley pressure Ppri (o) is calculated by further adding a safe amount of offset to a value obtained by multiplying the allowance rate calculated in the step S5 by the required primary pulley pressure Ppri*.

Figure 6:
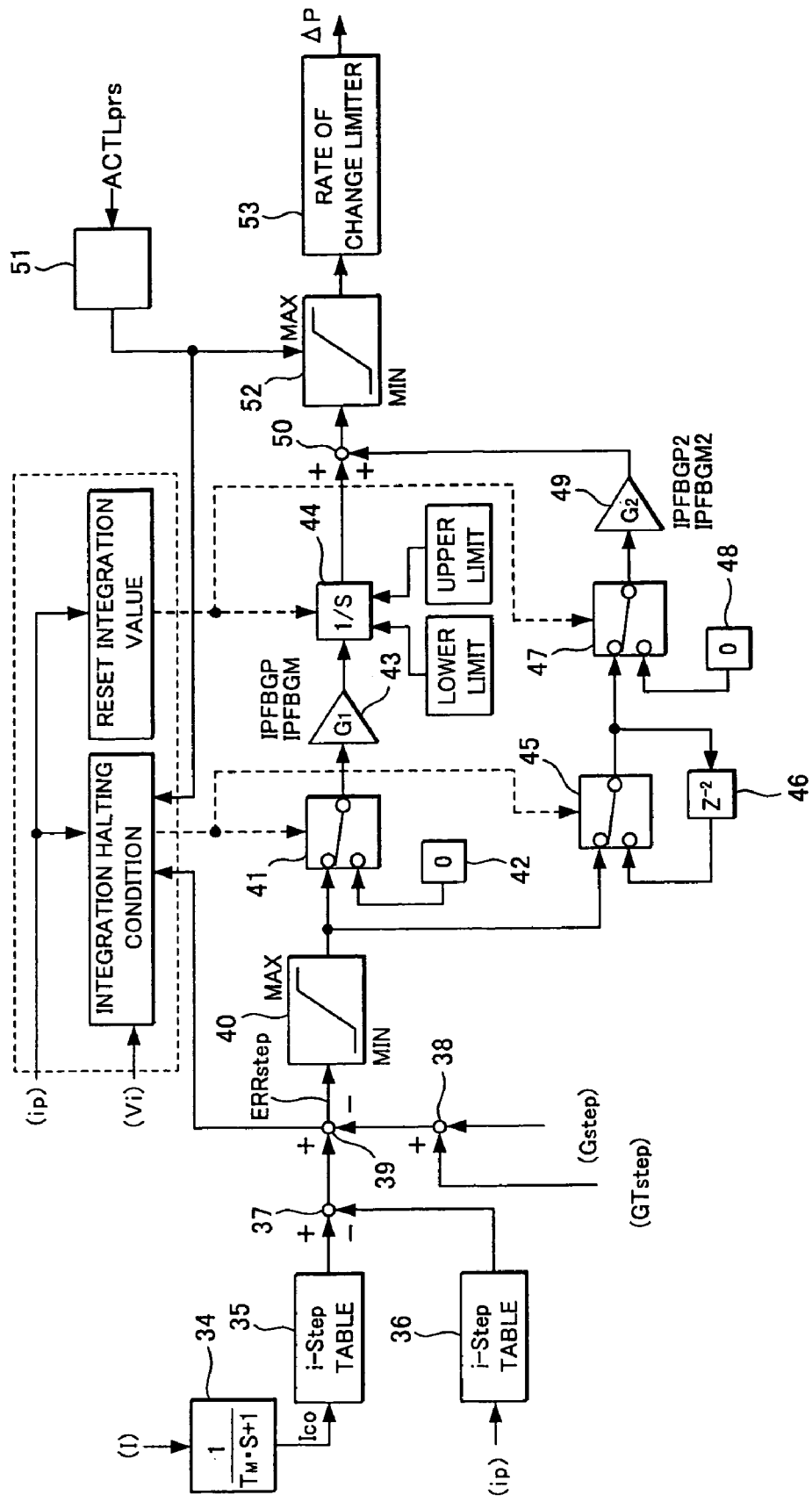
FIG. 6 is a block diagram for calculating a primary pulley pressure discrepancy according to an embodiment of this invention.
Figure 7:
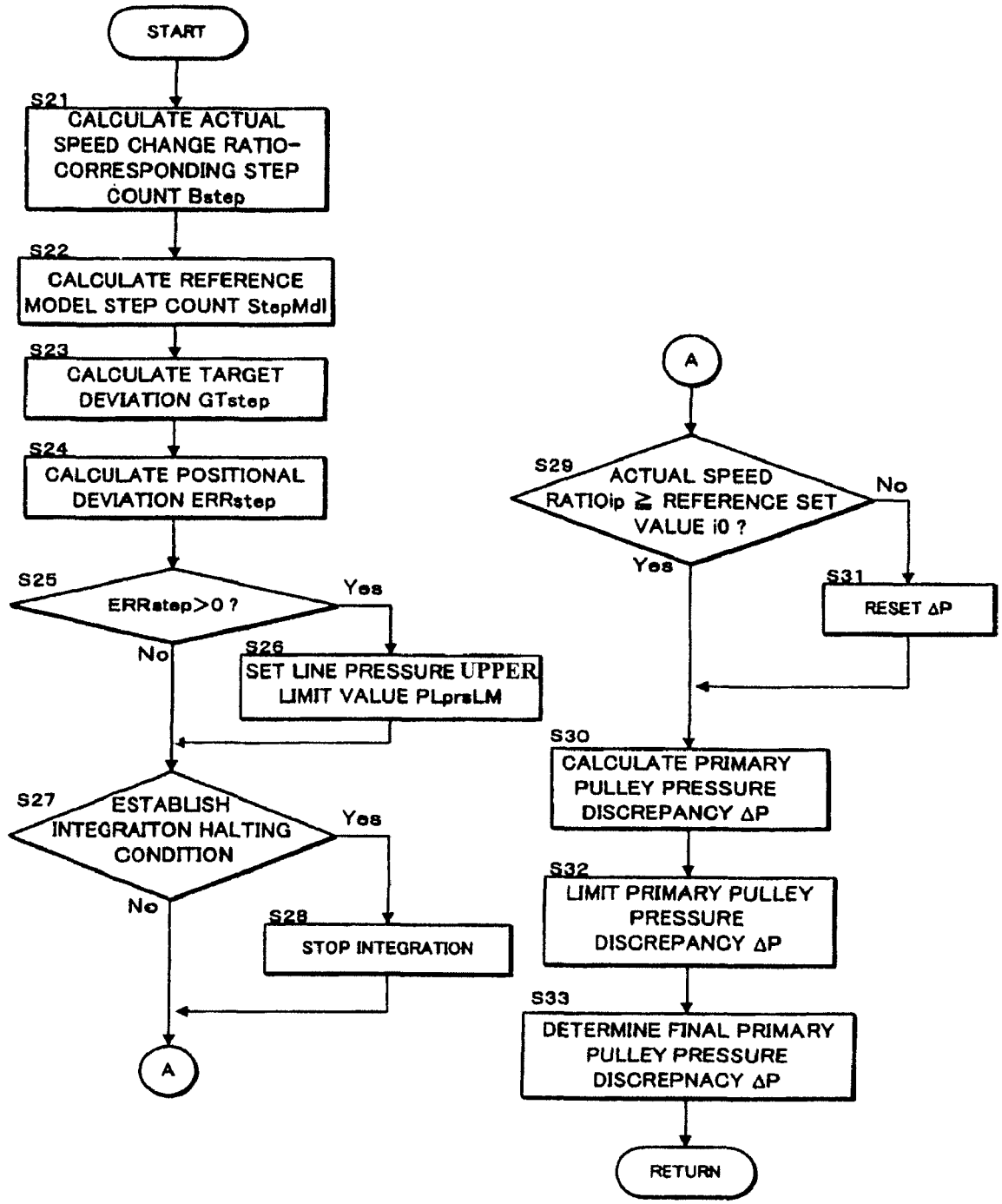
FIG. 7 is a flowchart for calculating the primary pulley pressure discrepancy according to an embodiment of this invention.

In a step S7, a primary pulley pressure discrepancy (line pressure correction amount) ΔP is calculated. A method of calculating the primary pulley pressure discrepancy ΔP will now be described in detail using FIGS. 6 and 7. FIG. 6 is a block diagram for calculating the primary pulley pressure discrepancy ΔP, and FIG. 7 is a flowchart for calculating the primary pulley pressure discrepancy ΔP.

First, description will be provided using the block diagram in FIG. 6.

In a reference model step count calculation unit (reference model operating position calculating means) 35, a reference model step count (reference model operating position) StepMdl corresponding to the target speed ratio I (o) calculated by a first-order delay filter unit 34 is calculated from the target speed ratio I (o) by a reverse calculation to that performed during speed change control, and in an actual speed ratio-corresponding step count calculation unit (actual operating position calculating means) 36, a step count (actual operating position) Bstep corresponding to the actual speed ratio is calculated simultaneously from the actual speed ratio ip by a reverse calculation to that performed during speed change control. Then, in a subtraction unit 37, a deviation (StepMdl−Bstep) between the reference model step count StepMdl and the actual speed change ratio-corresponding step count Bstep is calculated.

Meanwhile, in an addition unit (actuator operating position deviation correction amount calculating means) 38, an added value (operating position deviation correction amount) is calculated by adding together a target deviation GTstep, which is calculated in accordance with the transmission input torque Ti, and a starting learned value Gstep.

In a subtracting unit 39, a positional deviation (deviation) ERRstep (=StepMdl−(Bstep+GTstep+Gstep)) is calculated. Upper and lower limit values of the positional deviation ERRstep are limited by a positional deviation upper/lower limit value limiter 40 to facilitate subsequent calculation, and the resulting restricted value is input into an integral control determination device 41 and also input into a proportional control determination device 45.

While an integration halting condition, to be described in detail below, remains unsatisfied, the integral control determination device 41 selects the upper/lower limit value limiter 40, and the positional deviation ERRstep is input to perform integral control based on the positional deviation ERRstep. When the integration halting condition is satisfied, the integral control determination device 41 selects a zero input unit 42, and zero is input from the zero input unit 42 to hold the integral value.

When the integral control determination device 41 selects the upper/lower limit value limiter 40 such that the positional deviation ERRstep is input, a gain multiplication unit 43 multiplies the positional deviation ERRstep by a gain G1 of a unit system for converting the step count of the positional deviation ERRstep into the primary pulley pressure, and integrates a value IPFBGP obtained by multiplying the positional deviation ERRstep by the gain G1 in an integrator 44. In this embodiment, the integrator 44 limits the integration value generated by the integrator 44 to upper and lower limits. On the contrary, when the integral control determination device 41 selects the zero input unit 42 such that zero is input, an output value IPFBGM from the gain multiplication unit 43 becomes IPFBGM=0 (zero), and therefore the output from the integrator 44 also becomes zero.

While the integration halting condition remains unsatisfied, the proportional control determination device 45 selects the upper/lower limit value limiter 40, and the positional deviation ERRstep is input to perform proportional control based on the positional deviation ERRstep. When the integration halting condition is satisfied, the proportional control determination device 45 selects a feedback unit 46, and the positional deviation ERRstep of the previous control routine is input.

When the actual speed ratio ip is a High side speed ratio equal to or less than a reference set value i0 (for example, i0=1.0), a proportional control resetting determination device 47 selects the proportional control determination device 45, and the positional deviation ERRstep of the current control routine or the previous control routine is input. When the actual speed ratio ip is a Low side speed ratio exceeding a reference set value io, the proportional control resetting determination device 47 selects a zero input unit 48, and zero is input from the zero input unit 48.

When the proportional control resetting determination device 47 selects the proportional control determination device 45 such that the position deviation ERRstep is input, a gain multiplication unit 49 multiplies the positional deviation ERRstep by a gain G2 of a unit system for converting the step count of the positional deviation ERRstep into the primary pulley pressure, and outputs a value IPFBGP2 obtained by multiplying the positional deviation ERRstep by the gain G2. On the contrary, when the proportional control resetting determination device 47 selects the zero input unit 48 such that zero is input, the output from the proportional control resetting determination device 47 becomes zero, and hence an output value IPFBGM2 from the gain multiplication unit 49 also becomes zero.

In this way, while the integration halting condition remains unsatisfied, integral control and proportional control are both performed, and an addition unit (line pressure correction amount calculating means) 50 determines the primary pulley pressure discrepancy (line pressure correction amount) ΔP as an added value of the integrated value from the integrator 44 and the product from the gain multiplication unit 49. Conversely, when the integration halting condition is satisfied, the integration value from the integrator 44 and the product from the gain multiplication unit 49 remain the same as their previous values, and therefore the primary pulley pressure discrepancy ΔP is maintained at its current value.

Furthermore, when the actual speed ratio ip is a High side speed ratio equal to or less than the reference set value i0, integral control and proportional control are both performed, and the addition unit 50 determines the primary pulley pressure discrepancy ΔP as an added value of the integration value from the integrator 44 and the product from the gain multiplication unit 49. Conversely, when the actual speed ratio ip is a Low side speed ratio exceeding the reference set value io, neither integral control nor proportional control is performed, and hence the primary pulley pressure discrepancy ΔP becomes zero.

In a line pressure upper limit value setting unit (line pressure upper limit value calculating means) 51, a line pressure upper limit value PLprsLM is set on the basis of an actual primary pulley pressure ACTLprs detected by the primary pulley pressure sensor 20 when the sign of the positional deviation ERRstep is positive.

The primary pulley pressure discrepancy ΔP is limited to the upper limit and lower limit of the primary pulley pressure discrepancy ΔP by a line pressure correction amount upper/lower limit value limiter 52.

Further, in a line pressure correction amount rate of change limiter 53, the temporal rate of change of the primary pulley pressure discrepancy ΔP is limited, and under these limitations, the final primary pulley pressure discrepancy ΔP is determined.

Next, using the flowchart in FIG. 7, a method of calculating the primary pulley pressure discrepancy (line pressure correction amount) ΔP will be described.

In a step S21, the step count of the step motor 27, which is naturally assumed to correspond to the actual speed ratio ip, or in other words the actual speed ratio-corresponding step count Bstep (the operating position corresponding to the actual speed ratio of the step motor 27) is calculated from the actual speed ratio ip using a reverse calculation to that employed during speed change control.

In a step S22, the reference model step count StepMdl corresponding to the target speed ratio I (o) is calculated. In this case, similarly to the step S21, the reference model step count StepMdl is calculated from the target speed ratio I (o) using a reverse calculation to that employed during speed change control.

Figure 8:
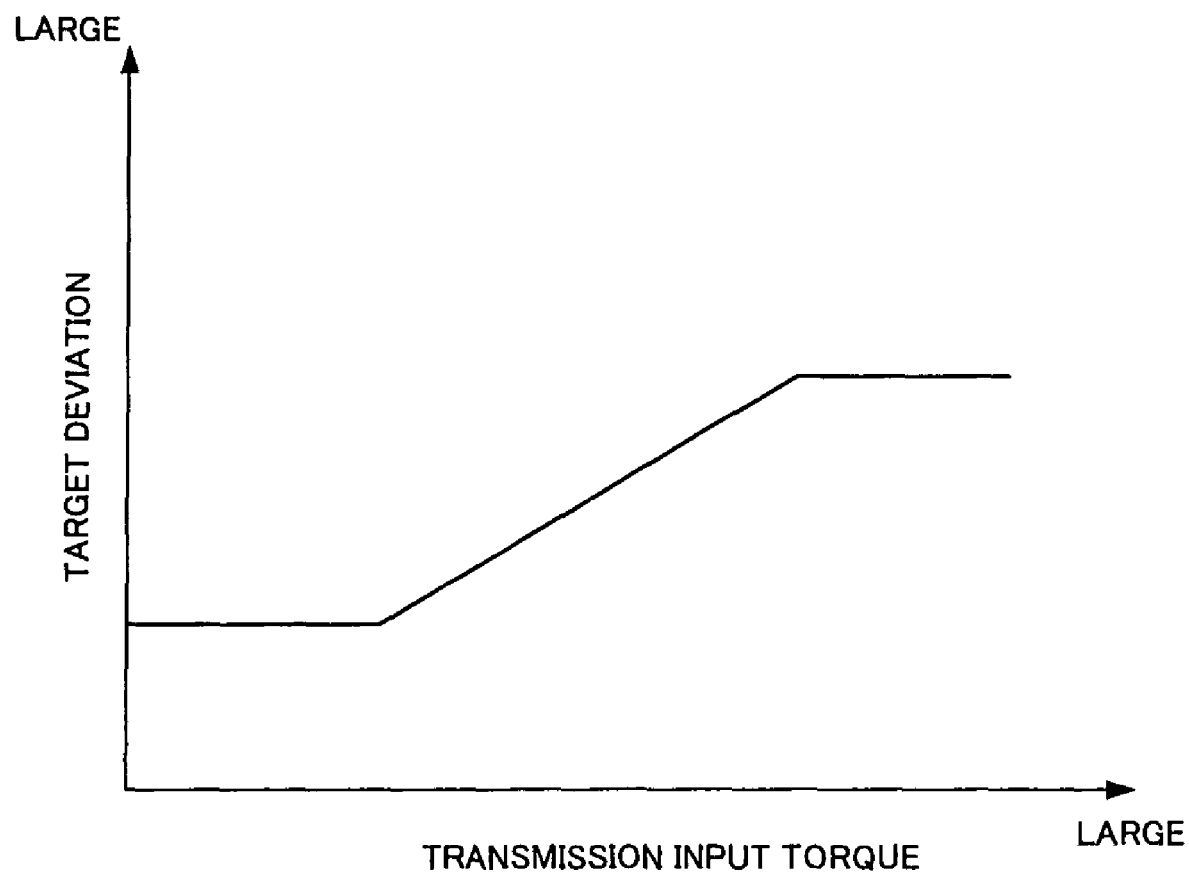
FIG. 8 is a map for calculating a target deviation according to an embodiment of this invention.

In a step S23, the target deviation GTstep is calculated in accordance with the transmission input torque Ti from a map shown in FIG. 8. The target deviation GTstep is set in accordance with the transmission input torque Ti such that as the transmission input torque Ti increases, or in other words advances to a high load (high torque side), the target deviation GTstep increases.

In a step S24, the positional deviation ERRstep of the step motor 27 is calculated from the reference model step count StepMdl, the actual speed ratio-corresponding step count Bstep, the target deviation GTstep, and the starting learned value Gstep using the following Equation (1)

$$ERRstep = StepMdl - (Bstep + GTstep + Gstep) \quad (1)$$

In other words, the positional deviation ERRstep of the step motor 27 is calculated from the deviation between the reference model step count StepMdl and an added value obtained by adding the target deviation GTstep and the starting learned value Gstep to the actual speed change ratio-corresponding step count Bstep. The starting learned value Gstep is a learned value for correcting attachment irregularities arising during attachment of the step motor 27 as a unit, and is learned from the deviation between a step count of the step motor 27 based on an actual speed ratio when a steady state with no speed change has continued for a fixed time period, and the actual step count of the step motor 27.

In a step S25, the sign of the positional deviation ERRstep calculated in the step S24 is determined. When the sign of the positional deviation ERRstep is positive, the routine advances to a step S26, and when the sign of the positional deviation ERRstep is negative, the routine advances to a step S27.

In this embodiment, when the sign of the positional deviation ERRstep is positive, the line pressure PL is determined to be insufficient, and control is performed to increase the line pressure correction amount ΔP. When the sign of the positional deviation ERRstep is negative, the line pressure PL is determined to be excessive, and control is performed to reduce the line pressure correction amount ΔP.

By means of the above control, when the transmission input torque Ti increases, the positional deviation ERRstep is reduced by raising the target deviation GTstep, and as a result, the line pressure PL tends to decrease. When the transmission input torque Ti is large, or in other words during a high load period, the target deviation GTstep is raised in accordance with the transmission input torque Ti such that the positional deviation ERRstep is reduced, and hence the actual positional deviation ERRstep is calculated accurately. In so doing, an erroneous control operation to raise the line pressure PL even when the line pressure PL is not actually insufficient can be prevented, and as a result, excessive increases in line pressure PL can be prevented, the fuel economy can be improved, and oil temperature increases can be suppressed.

In a step S26, the primary pulley pressure ACTLprs of the primary pulley 2 is detected by the primary pulley pressure sensor 20, and the line pressure upper limit value PLprsLM is set by adding a predetermined value to the detected primary pulley pressure ACTLprs. It should be noted that in this embodiment, the predetermined value is set at 1 MPa.

In a step S27, a determination is made as to whether or not the integration halting condition has been established. When the integration halting condition has not been established, the routine advances to a step S29, and when the integration halting condition has been established, the routine advances to a step S28.

The integration halting condition corresponds to any of a case in which a rate of change Vi of the actual speed ratio ip is comparatively high, i.e. equal to or higher than a reference set value V (0), a case in which the integration value is reset in a step S31 to be described below, a case in which a limitation is placed on increases in the line pressure PL to ensure that oil pressure is transmitted to another component, and a case in which the sign of the positional deviation ERRstep, calculated in the step S24, is positive and the primary pulley pressure discrepancy ΔP, calculated in a subsequent step S30 during the previous control routine, is higher than the line pressure upper limit value PLprsLM.

In the step S28, the integration halting condition has been established, and therefore integration is stopped and the routine advances to the step S29.

In the step S29, the actual speed ratio ip is compared with the reference set value i0 (for example, i0=1.0). When the actual speed ratio ip is larger than the reference set value i0, the actual speed ratio ip is determined to be on the High side and the routine advances to a step S30. When the actual speed ratio ip is smaller than the reference set value i0, the actual speed ratio ip is determined to be on the Low side and the routine advances to a step S31.

When the integration halting condition has not been established in the step S28, the positional deviation ERRstep is integrated in the step S30, and the primary pulley pressure discrepancy ΔP is calculated by adding together an integrated value obtained by multiplying the integrated value by the gain G1 of a unit system for converting the step count of the integrated value into the primary pulley pressure, and the product of the positional deviation ERRstep and the other gain G2 of a unit system for converting the positional deviation ERRstep into the primary pulley pressure. When integration is halted in the step S28, the primary pulley pressure discrepancy ΔP calculated in the previous control routine is held.

In the step S31, the actual speed ratio ip is a Low side speed ratio smaller than the reference set value i0, and therefore the primary pulley pressure discrepancy ΔP is reset to zero.

In a step S32, the primary pulley pressure discrepancy ΔP is limited to upper and lower limits. Here, when the sign of the positional deviation ERRstep is determined to be positive in the step S25, the primary pulley pressure discrepancy (line pressure correction amount) ΔP is limited such that the line pressure PL does not exceed the line pressure upper limit value PLprsLM set in the step S26. In this embodiment, the actual primary pulley pressure ACTLprs is detected by the primary pulley pressure sensor 20 in the step S26, and the primary pulley pressure discrepancy (line pressure correction amount) ΔP is limited so as not to exceed the line pressure upper limit value PLprsLM, which is obtained by adding a predetermined value to the primary pulley pressure ACTLprs. In so doing, the line pressure PL is prevented from rising excessively in relation to the actual primary pulley pressure ACTLprs, and hence excessive line pressure caused by irregularities in the units of the step motor 27 can be prevented, the fuel economy can be improved, and oil temperature increases can be suppressed.

In a step S33, the final primary pulley pressure discrepancy (line pressure correction amount) ΔP is determined while restricting the temporal rate of change in the primary pulley pressure discrepancy (line pressure correction amount) ΔP.

By means of the above control, the primary pulley pressure discrepancy (line pressure correction amount) ΔP of the step S7 in FIG. 3 is calculated.

In a step S8 of FIG. 3, a primary pulley pressure command value Ppri (DSR) is calculated by adding the primary pulley pressure discrepancy (line pressure correction amount) ΔP determined in the step S7 to the target primary pulley pressure Ppri (o) determined in the step S6.

In a step S9, the primary pulley pressure command value Ppri (DSR) is compared with the required secondary pulley pressure Psec*, calculated in the step S3, to determine which of the primary pulley pressure Ppri and the secondary pulley pressure. Psec is likely to interfere with the line pressure PL when the line pressure PL is suppressed in order to improve the fuel economy. As is evident from FIG. 1, when primary pulley pressure Ppri>secondary pulley pressure Psec, the V belt continuously variable transmission 1 of this embodiment performs an upshift, and when primary pulley pressure Ppri<secondary pulley pressure Psec, the continuously variable transmission 1 performs a downshift.

If the primary pulley pressure command value Ppri (DSR) is equal to or greater than the required secondary pulley pressure Psec* in the step S9, it is determined that the primary pulley pressure Ppri is on the High side and therefore likely to interfere with the line pressure PL. Hence, in a step S10, an identical value to the primary pulley pressure command value Ppri (DSR) is set as the target line pressure PL*, and a drive duty corresponding to the target line pressure PL* is output to the solenoid 23a of the pressure regulator valve 23. As a result, the target line pressure PL* takes a value obtained by correcting the target primary pulley pressure Ppri by the line pressure correction amount (primary pulley pressure discrepancy ΔP), and line pressure correction is performed.

Conversely, when the primary pulley pressure command value Ppri (DSR) is lower than the required secondary pulley pressure Psec* in the step S9, it is determined that the secondary pulley pressure Psec is on the Low side and therefore likely to interfere with the line pressure PL. Hence, in a step S 11, an identical value to the required secondary pulley pressure Psec* is set as the target line pressure PL*, and a drive duty corresponding to the target line pressure PL* is output to the solenoid 23a of the pressure regulator valve 23. Here, the target line pressure PL* becomes the required secondary pulley pressure Psec*, and line pressure correction is not performed.

By realizing the target line pressure PL*, which is set by means of the above control, the line pressure PL serving as the source pressure of the primary pulley pressure Ppri and secondary pulley pressure Psec is controlled.

The effects of this invention will now be described.

In this embodiment, the positional deviation ERRstep of the step motor 27 is calculated on the basis of the reference model step count StepMdl of the step motor 27 calculated from the target speed ratio I (o), the actual speed ratio-corresponding step count Bstep of the step motor 27 calculated from the actual speed ratio ip, and an added value obtained by adding together the target deviation GTstep, which is calculated in accordance with the transmission input torque Ti, and the starting learned value Gstep, and the line pressure PL is controlled on the basis of the positional deviation ERRstep. When the transmission input torque Ti increases, or in other words at a high load, the target deviation GTstep is set to be large so that the positional deviation ERRstep is calculated accurately. As a result, a situation in which the positional deviation is overestimated during a high load period and the line pressure is controlled in accordance with this positional deviation, leading to an excessive line pressure, can be prevented, enabling an improvement in fuel economy and suppression of oil temperature increases.

When the sign of the positional deviation ERRstep of the step motor 27 becomes positive and the line pressure PL is increased, the line pressure correction amount ΔP is limited such that the line pressure PL does not exceed the line pressure upper limit value PLprsLM, which is obtained by adding a predetermined value to the primary pulley pressure ACTLprs. In so doing, the line pressure PL is prevented from rising excessively in relation to the actual primary pulley pressure ACTLprs, and thus an excessive line pressure caused by large irregularities in the units of the step motor 27 can be prevented, enabling an improvement in fuel economy and suppression of oil temperature increases.

This application claims priority from Japanese Patent Application 2005-290918, filed Oct. 4, 2005, which is incorporated herein by reference in its entirety.

What is claimed is:

1. A continuously variable transmission, comprising:
an input side primary pulley having a groove width which varies according to an oil pressure;
an output side secondary pulley having a groove width which varies according to an oil pressure;
a belt wrapped around the primary pulley and the secondary pulley, a pulley-contacting radius of which varies according to groove width;
an actuator which varies the oil pressure of the primary pulley according to a driving condition; and
a controller, which:
calculates a reference model operating position, which is an operating position of the actuator corresponding to a target speed ratio;
calculates an actual operating position of the actuator from an actual speed ratio between the primary pulley and the secondary pulley;
calculates a primary pulley input torque;
calculates an actuator operating position deviation correction amount which helps to correct a deviation between the reference model operating position and the actual operating position when the primary pulley input torque is on a high torque side to be larger than the actuator operating position deviation correction amount when the primary pulley input torque is on a low torque side; and
controls a line pressure, which serves as a source pressure of the oil pressure of the primary pulley and the oil pressure of the secondary pulley, on a basis of the reference model operating position, the actual operating position, and the actuator operating position deviation correction amount.

2. The continuously variable transmission as defined in claim 1, wherein the controller calculates a line pressure correction amount on a basis of a deviation between the reference model operating position and an added value obtained by adding the actuator operating position deviation correction amount to the actual operating position, and controls the line pressure on a basis of the line pressure correction amount.

3. The continuously variable transmission as defined in claim 2, further comprising:
a sensor which detects the oil pressure of the primary pulley; wherein
the controller calculates a line pressure upper limit value by adding a predetermined value to the oil pressure of the primary pulley when a sign of the deviation is positive, and limits the line pressure correction amount such that the line pressure does not exceed the line pressure upper limit value when the sign of the deviation is positive.

4. The continuously variable transmission as defined in claim 2, further comprising:
a sensor which detects the oil pressure of the primary pulley; wherein
the controller calculates a line pressure upper limit value by adding a predetermined value to the oil pressure of the primary pulley when a sign of the deviation between the reference model operating position and an added value obtained by adding the actuator operating position deviation correction amount to the actual operating position is positive, and limits the line pressure correction amount such that the line pressure does not exceed the line pressure upper limit value when the sign of the deviation is positive.

5. A control method for a continuously variable transmission, the transmission comprising:
an input side primary pulley having a groove width which varies according to an oil pressure;
an output side secondary pulley having a groove width which varies according to an oil pressure;
a belt wrapped around the primary pulley and the secondary pulley, a pulley-contacting radius of which varies according to a groove width, and
an actuator which varies the oil pressure of the primary pulley according to a driving condition, wherein
the control method comprises:
calculating a reference model operating position, which is an operating position of the actuator corresponding to a target speed ratio;
calculating an actual operating position of the actuator from an actual speed ratio between the primary pulley and the secondary pulley;
calculating a primary pulley input torque;
calculating an actuator operating position deviation correction amount which helps to correct a deviation between the reference model operating position and the actual operating position when the primary pulley input torque is on a high torque side to be larger than the actuator operating position deviation correction amount when the primary pulley input torque is on a low torque side; and
controlling a line pressure, which serves as a source pressure of the oil pressure of the primary pulley and the oil pressure of the secondary pulley, on a basis of the reference model operating position, the actual operating position, and the actuator operating position deviation correction amount.

6. The control method for a continuously variable transmission as defined in claim 5, further comprising:
calculating a line pressure correction amount on a basis of a deviation between the reference model operating position and an added value obtained by adding the actuator operating position deviation correction amount to the actual operating position; and
controlling the line pressure on a basis of the line pressure correction amount.

7. The control method for a continuously variable transmission as defined in claim 6, further comprising:
detecting the oil pressure of the primary pulley;
calculating a line pressure upper limit value by adding a predetermined value to the oil pressure of the primary pulley when a sign of the deviation is positive; and
limiting the line pressure correction amount such that the line pressure does not exceed the line pressure upper limit value when the sign of the deviation is positive.

8. The control method for a continuously variable transmission as defined in claim 6, further comprising:
detecting the oil pressure of the primary pulley;
calculating a line pressure upper limit value by adding a predetermined value to the oil pressure of the primary pulley when a sign of the deviation between the reference model operating position and an added value obtained by adding the actuator operating position deviation correction amount to the actual operating position is positive; and
limiting the line pressure correction amount such that the line pressure does not exceed the line pressure upper limit value when the sign of the deviation is positive.

* * * * *